United States Patent [19]

Parker et al.

[11] Patent Number: 4,517,331
[45] Date of Patent: May 14, 1985

[54] ACTIVATING PLASTICIZER FOR URETHANE PREPOLYMERS AND COMPLEX OF ALKALI METAL SALT WITH 4,4'-METHYLENEDIANILINE

[75] Inventors: Dane K. Parker, Massillon; Joseph A. Kuczkowski, Munroe Falls, both of Ohio; Michael E. Kimball, West Brook, Me.

[73] Assignee: The Goodyear Tire & Rubber Company, Akron, Ohio

[21] Appl. No.: 586,369

[22] Filed: Mar. 5, 1984

[51] Int. Cl.$^3$ .................. C08G 18/32; C08G 18/16; C08G 18/50; C08G 18/48
[52] U.S. Cl. .................. 524/451; 252/188.31; 528/48; 528/52; 528/64
[58] Field of Search .................. 252/188.31; 528/64, 528/48, 52; 524/451

[56] References Cited

U.S. PATENT DOCUMENTS

| | | | |
|---|---|---|---|
| 3,726,835 | 4/1973 | Bertozzi | 260/75 NH |
| 3,755,261 | 8/1973 | Van Gulick | 528/64 |
| 3,876,604 | 4/1975 | Caruso | 524/769 |
| 3,888,831 | 6/1975 | Kogon | 528/64 |
| 3,891,606 | 6/1975 | Kogon | 528/64 |
| 3,899,438 | 8/1975 | Kalil | 528/64 |
| 3,965,073 | 6/1976 | Olstowski et al. | 260/77.5 AN |
| 4,182,898 | 1/1980 | Fujiwara et al. | 560/26 |
| 4,282,344 | 8/1981 | Caruso | 528/51 |
| 4,438,251 | 3/1984 | Herweh | 528/73 |

*Primary Examiner*—Herbert S. Cockeram
*Attorney, Agent, or Firm*—J. D. Wolfe; R. D. Thompson

[57] ABSTRACT

Storable polypropylene ether polyurethane compositions composed of (a) a prepolymer of a polypropylene ether glycol and sufficient organic polyisocyanate to give preferably an excess of about 3 to 15 percent NCO in said prepolymer with the proviso that the free NCO is obtained from methylenedi-p-phenyl diisocyanate and (b) a complex of an alkali metal salt with 4,4'-methylenedianiline (MDA), said composition being relatively inactive at temperatures below 100° C., but being heat activatible at much higher temperatures to effect a cure. The improved composition wherein a catalyst is present in said composition which effectively lowers the cure temperature, said catalyst being a pseudocrown ether containing radicals having the formula $-(y-CH_2-CH_2)_n$ with y being nitrogen, sulfur or oxygen and n has values sufficient to form the crown structure, viz., at least 3 or more.

8 Claims, No Drawings

ACTIVATING PLASTICIZER FOR URETHANE PREPOLYMERS AND COMPLEX OF ALKALI METAL SALT WITH 4,4'-METHYLENEDIANILINE

TECHNICAL FIELD

This invention relates to a plasticizer to activate the salt MDA complex to permit said complex to cure more readily an isocyanate prepolymer. More particularly, this invention relates to the use of a catalyst as a plasticizer that causes the salt MDA complex to cure the prepolymer at a lower temperature.

BACKGROUND

U.S. Patents, such as U.S. Pat. No. 3,755,261 to Norman M. VanGulick and U.S. Pat. No. 3,891,606 to Irving Charles Kogon teach isocyanate prepolymer can be cured by the use of a complex of 4,4'-methylene dianiline and selected alkali metal salts, preferably sodium, potassium and lithium, and to include sodium chloride. Said complex is used in conjunction with a compound containing a source of active hydrogen, preferably a polyfunctional compound such as polyfunctional alcohol, e.g. glycerol. Optionally the combination of the complex and the source of active hydrogen is dispersed in an inert vehicle such as an organic liquid e.g. di(2-ethylhexyl)phthalate or tetra ethylene glycol dioctanoate. Unfortunately these amine salt complexes do not give satisfactory cures at relatively low temperatures 25° to 30° degrees above about 100° C. with the more economical polyether glycol prepolymers, for instance those of polypropylene ether glycol or polyol.

Although the prior art describes the plasticizer or vehicles for the MDI-salt complex in broad terms, it did not teach that certain vehicles were superior to others or in effect acted catalytically to speed the rate of cure and to lower the cure activation temperature.

SUMMARY OF THE INVENTION

The storable polypropylene ether polyurethane composition of this invention comprising a mixture of (a) an equivalent of a prepolymer formed by reacting polypropylene ether polyol of 2 to 6 OH, preferably a glycol, with sufficient organic polyisocyanate to give an excess of about 3 to 15 percent by weight of free NCO in said prepolymer with the proviso that the free NCO is obtained from methylenedi-p-phenyl diisocyanate; (b) 0.7 to 1.05 equivalents of a complex of an alkali metal salt with 4,4'-methylenedianiline, said alkali metal preferably being selected from the class consisting of sodium, potassium and lithium; and (c) a catalyst for said complex consisting preferably of a fluid, pseudocrown ether, the pseudocrown of said ether being composed of sufficient radicals having the formula unit $-(y-CH_2-CH_2)_n$ wherein y can be nitrogen, sulfur or oxygen to give n the value to form a pseudocrown.

We have discussed that if the plasticizer or vehicle is to exhibit catalytic action, it should have the structure feature of $-(y-CH_2-CH_2)_n$ group to effect the complex with MDA and salt. The catalysts of this invention exhibit features known to organic chemists as pseudocrown ethers. Generally y in the radical can be nitrogen, sulfur and oxygen with oxygen being the preferred member. Generally, the smallest coupling of radicals considered to be a pseudocrown has 9 or so atoms with n being at least 3.

The vehicle or plasticizer utilizable in this invention to produce storable polypropylene ether polyurethane composition which are cure activatible at lower temperatures than those without these vehicles are considered as catalysts. These catalysts are the following
(i) polyethylene glycol diethers of the formula

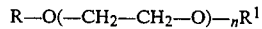

where R is the same or different from $R^1$ and is selected from the group consisting of alkyl radicals having 1 to about 20 carbon atoms, cycoalkyl radicals having 4 to about 12 carbon atoms, aromatic or substituted aromatic radicals having from 6 to about 25 carbon atoms, and aralkyl radicals having from 7 to 25 carbon atoms and n has values of 3 to 500 and preferably 4 to 100.
(ii) mixed polyethylene glycol ester ethers of the formula

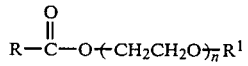

where R, $R^1$ and n are used to designate the radicals and values given above for the formula of (i) and
(iii) crown ethers selected from the class consisting of 15-crown-5, 18-crown-6, benzo-15-crown-5, cyclohexane-15-crown-5, benzo-18-crown-6, cyclohexane-18-crown-6, dibenzo-18-crown-6 and dicyclohexane-18-crown-6.

The nature and advantages of this invention can be seen more readily and appreciated by reference to the following representative examples where all parts and percentages are by weight unless otherwise indicated.

EXAMPLE 1

Two prepolymers were prepared using recipe A and B where recipe A used 200 parts of a 1000 molecular weight polypropylene ether glycol capped with ethylene oxide, 150 parts of talc and 172 parts of polymeric polyisocyanate (MDI) type and recipe B used 200 parts of 1000 molecular weight polyproylene ether glycol, 150 parts of talc and 172 parts of polymeric MDI polyisocyanate type. These prepolymers were prepared using either recipe A or B by placing the polyether glycol in the reactor then adding the talc and flaked methylenedi-p-phenyl diisocyanate (MDI) and reacting the isocyanate therewith under a vacuum and with heating to give a prepolymer having about 6 to 8% free NCO content. These prepolymers were called prepolymers A and B respectively and were reacted with amine salt complexes containing various amounts of the dimethyl ether derivative of tetraethylene glycol called tetraglyme as a plasticizer for the complex to produce cured polymers as shown in the tables. Usually it is possible to use small amounts of silicate fillers up to 50 parts per 100 parts of the polyurethane composition to control the prepolymer viscosity.

The polypropylene ether glycol or in some cases polyol may have a molecular weight of about 500 to 6000 and preferably about 900 to 4500, and the preferred polypropylene ether polyols are capped with ethylene oxide to give primary hydroxyls on the polyol chains.

In Table I and II the various polyurethanes produced by reacting and curing the prepolymers A and B with two different commercial MDA-NaCl complexes using two different vehicles, i.e., curatives A and B of the prior art are compared with the results obtained when varying amounts of the catalyst of the instant invention is added to the MDA-NaCl complexes to effect the cure temperature.

The results of these tests are shown in Tables I and II on both fresh sample mixes and sample mixes aged two weeks at room temperature. The curing characteristics of these systems were measured by differential scanning calorimetry (DSC) and results of these tests are indicated by T max cures. This data shows that the use of pseudocrown type plasticizer or vehicle for the MDA-salt complexes results in cures at a lower temperature.

TABLE I

|  | 1 | 2 | 3 |
|---|---|---|---|
| Prepolymer A | 522 | 522 | 522 |
| Curative A | 64 | 64 | 64 |
| Tetraglyme | — | 14 | 29 |
| Sample wt. (gm.) | .0352 | .0170 | .0291 |
| Tmax, (°C.) | 185 | 133.5 | 118 |
| Peak Area (div. × 2° C.) | 546.8 | 271.1 | 413.6 |
| Aged Sample* wt. (gm.) | .0351 | .0344 | .0329 |
| Tmax, (°C.) | 172 | 135 | 121 |
| Peak Area | 615.2 | 587 | 452.4 |

*2 weeks at room temperature.
Curative A is a commercial product of a MDA-NaCl complex in dioctyl phthalate.

TABLE II

|  | A | B | C | D |
|---|---|---|---|---|
| Prepolymer A | 522 | 522 | 522 | — |
| Prepolymer B | — | — | — | 522 |
| Curative A | — | — | — | — |
| Curative B | 64 | 64 | 64 | 64 |
| Tetraglyme | 5 | 14 | — | — |
| Sample wt. (gm.) | .0345 | .0307 | .0204 | .0337 |
| Tmax, (°C.) | 131 | 127 | 140 | 146 |
| Peak Area (div. × 2° C.) | 502.5 | 449.8 | 337.9 | 524.1 |
| Aged Sample* wt. (gm.) | .0380 | .0417 | .0272 | .0278 |
| Tmax, (°C.) | 144 | 137 | 137.5 | 147.5 |

TABLE II-continued

|  | A | B | C | D |
|---|---|---|---|---|
| Peak Area | 610.3 | 571.7 | 384.5 | 428.0 |

*2 weeks at room temperature.
Curative A is a commercial product of a MDA-NaCl complex in dioctyl phthalate.
Curative B is a commercial product of a MDA-NaCl complex in tetraethylene glycol dioctanoate.

We claim:

1. The storable polypropylene ether polyurethane composition comprising a mixture of
   (a) an equivalent of a prepolymer formed by reacting a polypropylene ether polyol of 2 to 6 OH with sufficient organic polyisocyanate to give an excess of about 3 to 15 percent by weight of free NCO in said prepolymer with the proviso that the free NCO is obtained from methane di(phenyl isocyanate);
   (b) 0.7 to 1.05 equivalents of a complex of an alkali metal salt with 4,4'-methylenedianiline, said alkali metal being selected from the class consisting of sodium, potassium and lithium; and
   (c) a catalyst for said complex consisting of a crown or pseudocrown ether, said ether being composed of radicals having the structural formula $-(y-CH_2-CH_2)_n$ where y can be nitrogen, sulfur or oxygen and n is a number 3 to 100.

2. The composition of claim 1 wherein the catalyst is the dimethyl ether of tetraethylene glycol.

3. The polyurethane composition of claim 1 wherein the polypropylene ether glycol has a molecular weight of about 900 to 4500.

4. The polyurethane composition of claim 1 containing a small amount to about 50 parts of silicate filler per 100 parts of the polyurethane composition.

5. The polyurethane composition of claim 3 wherein the silicate filler is talc.

6. The polyurethane composition of claim 1 wherein the free NCO is about 5 to 10 percent.

7. The polyurethane composition of claim 1 wherein y in the repeating radical is oxygen.

8. The polyurethane composition of claim 1 wherein the catalyst is present in from 0.1 to 20 parts per hundred of said prepolymer.

* * * * *